United States Patent
Dropps et al.

(10) Patent No.: US 7,593,997 B2
(45) Date of Patent: Sep. 22, 2009

(54) METHOD AND SYSTEM FOR LUN REMAPPING IN FIBRE CHANNEL NETWORKS

(75) Inventors: Frank R. Dropps, Maple Grove, MN (US); Edward C. Ross, Edina, MN (US); Steven M. Betker, Shoreview, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 925 days.

(21) Appl. No.: 10/956,502

(22) Filed: Oct. 1, 2004

(65) Prior Publication Data

US 2006/0072616 A1    Apr. 6, 2006

(51) Int. Cl.
G06F 15/16 (2006.01)
G06F 13/00 (2006.01)
H04L 11/00 (2006.01)

(52) U.S. Cl. .................... 709/212; 711/111; 370/374

(58) Field of Classification Search ................ 709/212, 709/214, 216; 370/374, 383, 389; 711/6, 711/100, 111, 112, 152, 154
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | ............ 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | .............. 370/58 |
| 4,546,468 A | 10/1985 | Christmas et al. | .............. 370/54 |
| 4,569,043 A | 2/1986 | Simmons et al. | .............. 370/63 |
| 4,691,296 A | 9/1987 | Struger | |
| 4,716,561 A | 12/1987 | Angell et al. | |
| 4,725,835 A | 2/1988 | Schreiner et al. | ........ 340/825.83 |
| 4,821,034 A | 4/1989 | Anderson et al. | ............ 340/825 |
| 4,860,193 A | 8/1989 | Bentley et al. | |
| 4,964,119 A | 10/1990 | Endo et al. | |
| 4,980,857 A | 12/1990 | Walter et al. | |

(Continued)

FOREIGN PATENT DOCUMENTS

EP    0649098    9/1994

(Continued)

OTHER PUBLICATIONS

Curtis, A. R., "Design Considerations for 10-Gbit Fibre Channel", *Curtis A. Ridgeway, Distinguished I/O Architect, Storage and Computing ASIC's Division, LSI Logic Corp.*

(Continued)

*Primary Examiner*—Yemane Mesfin
(74) *Attorney, Agent, or Firm*—Klein, O'Neill & Singh, LLP

(57) ABSTRACT

A Fibre Channel switch element in a Fibre Channel network is provided. The Fibre Channel switch element includes a port that replaces a logical unit number ("LUN") field value in a FCP_CMND frame. The port includes a LUN Mapping cache for replacing the LUN field value in a FCP_CMND frame. The LUN Mapping cache may also generate a value that is added to or subtracted from the LUN field value in the FCP_CMND frame. A control bit is used to activate LUN Mapping cache for mapping LUN values.

17 Claims, 7 Drawing Sheets

U.S. PATENT DOCUMENTS

| | | | |
|---|---|---|---|
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,666,483 A | 9/1997 | McClary | |
| 5,677,909 A | 10/1997 | Heide | |
| 5,687,172 A | 11/1997 | Cloonan et al. | 370/395 |
| 5,732,206 A | 3/1998 | Mendel | |
| 5,748,612 A | 5/1998 | Stoevhase et al. | 370/230 |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,937,169 A | 8/1999 | Connery et al. | |
| 5,954,796 A | 9/1999 | McCarty et al. | |
| 5,974,547 A | 10/1999 | Klimenko | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,046,979 A | 4/2000 | Bauman | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,147,976 A | 11/2000 | Shand et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,246,683 B1 | 6/2001 | Connery et al. | |
| 6,247,060 B1 | 6/2001 | Boucher et al. | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry | 710/261 |
| 6,470,026 B1 | 10/2002 | Pearson et al. | |
| 6,470,173 B1 | 10/2002 | Okada et al. | |
| 6,470,415 B1 | 10/2002 | Starr et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,591,302 B2 | 7/2003 | Boucher et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,629,161 B2 | 9/2003 | Matsuki et al. | |
| 6,643,298 B1 | 11/2003 | Brunheroto et al. | |
| 6,657,962 B1 | 12/2003 | Barri et al. | |
| 6,684,209 B1 * | 1/2004 | Ito et al. | 707/9 |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,779,083 B2 * | 8/2004 | Ito et al. | 711/114 |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |

| Patent/Pub No. | Date | Inventor(s) |
|---|---|---|
| 6,886,141 B1 | 4/2005 | Kunz et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 * | 8/2005 | Acharya et al. ............. 711/112 |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 | 12/2005 | Parry et al. |
| 6,987,768 B1 * | 1/2006 | Kojima et al. ............... 370/401 |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 * | 4/2006 | Ito et al. ........................ 707/9 |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,092,374 B1 | 8/2006 | Gubbi |
| 7,110,394 B1 | 9/2006 | Chamdani et al. |
| 7,120,728 B2 * | 10/2006 | Krakirian et al. ................ 711/6 |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,570 B2 | 6/2007 | Gregg |
| 7,233,985 B2 | 6/2007 | Hahn et al. |
| 7,245,613 B1 | 7/2007 | Winkles et al. |
| 7,245,627 B2 | 7/2007 | Goldenberg et al. |
| 7,248,580 B2 | 7/2007 | George et al. |
| 7,263,593 B2 * | 8/2007 | Honda et al. ................. 711/205 |
| 7,266,286 B2 | 9/2007 | Tanizawa et al. |
| 7,269,131 B2 | 9/2007 | Cashman et al. |
| 7,269,168 B2 * | 9/2007 | Roy et al. .................... 370/374 |
| 7,277,431 B2 * | 10/2007 | Walter et al. ................. 370/389 |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 * | 4/2008 | Hammons et al. ........... 370/386 |
| 7,397,788 B2 | 7/2008 | Mies et al. |
| 7,406,034 B1 | 7/2008 | Cometto et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. .................. 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 * | 9/2003 | Edsall et al. ................. 709/224 |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ................ 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054776 A1 | 3/2004 | Klotz et al. |

| | | |
|---|---|---|
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0120340 A1 | 6/2004 | Furey et al. |
| 2004/0123181 A1 | 6/2004 | Moon et al. |
| 2004/0141518 A1 | 7/2004 | Milligan et al. |
| 2004/0141521 A1 | 7/2004 | George ............... 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0188245 A1 | 8/2005 | Seto et al. |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Malavalli, Kumar, "High Speed Fibre Channel Switching Fabric Services", *Proceedings of the SPIE, SPIE*Bellingham, VA, USA vol. 1577, XP000562869, ISSN: 0277-786X, Sep. 4, 1991, 216-226.

Melhem, et al., "Minimizing Wavelength Conversions in WDM Path Establishment", *Computer Science Department, University of Pittsburgh*, Pittsburgh, PA 15260. (2001),197-211.

Ridgeway, Curt, "0GFC-40GFC using 4-lane XAUI's", *LSI Logic Presentation—T11/03-069v0.*

Brown, Douglas W., "A State-Machine Synthesizer", *18th Design Automation Conference*, (1981),301-305.

"Examination Report from the European Patent Office dated Oct. 12, 2007 for European Application No. 05 805 632.6".

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al., "Inter-Fabric Routing", dated Jul. 30, 2004, Inter Fabric Routing (04-520v0); pp. 1-31.

DeSanti et al., "Virtual Fabrics"; Virtual Fabrics, T11/03-352v0, May 2003; pp. 1-4.

Martin et al, "Virtual Channel Architecture", Presentation by Brocade to T11/03-369V0 dated Jun. 2, 2003.

* cited by examiner

METHOD AND SYSTEM FOR LUN REMAPPING IN FIBRE CHANNEL NETWORKS

BACKGROUND

1. Field of the Invention

The present invention relates to storage area networks, and more particularly, to logical unit number ("LUN") remapping where a Fibre Channel switch maps virtual LUNs to actual physical LUNs.

2. Background of the Invention

Storage area networks ("SANs") are commonly used where plural memory storage devices are made available to various host computing systems. Data in a SAN is typically moved from plural host systems (that include computer systems, servers etc.) to a storage system through various controllers/adapters.

Host systems often communicate with storage systems via a host bus adapter ("HBA", may also be referred to as a "controller" and/or "adapter") using an interface, for example, the "PCI" bus interface.

FIG. 1A shows a block diagram with a host system 10 having a HBA 11 that is coupled to a switch 12. Switch 12 is also coupled to storage system 14 and 20. Storage system 14 includes HBA 13 and is coupled to storage devices 15, 16 and 17. Storage system 20A with HBA 21 is coupled to storage devices 18 and 19. The term storage device in this context includes, disk, tape drives or any other media used for storing electronic information.

Host system 10 typically includes several functional components. These components may include a central processing unit (CPU), main memory, input/output ("I/O") devices (not shown), read only memory, and streaming storage devices (for example, tape drives).

Storage devices (for example, 15, 16, 17, 18 and 19) are coupled using the Small Computer Systems Interface ("SCSI") protocol and use the SCSI Fibre Channel Protocol ("SCSI FCP") to communicate with other devices/systems. Both the SCSI and SCSI FCP standard protocols are incorporated herein by reference in their entirety. SCSI FCP is a mapping protocol for applying SCSI command set to Fibre Channel.

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or "F_port". Fabric elements include the intelligence to handle routing, error detection, recovery, and similar management functions.

A Fibre Channel switch (for example, 12) is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre channel switches use memory buffers to hold frames received and sent across a network. Associated with these buffers are credits, which are the number of frames that a buffer can hold per fabric port.

Fibre Channel storage devices using the SCSI FCP protocol typically use the client/server model. Typically, the client is a host system with an HBA (an "Initiator") such as a file server that issues a read or write command to a "Target". The Target may be a disk array that responds to the client request. Most storage devices such as disk drives or tape drives are SCSI target devices. Initiator devices (usually host bus adapters on server computers) start all I/O operations.

Storage virtualization defines virtual storage units for end-users and maps the virtual storage units to actual physical storage locations. Efficient storage virtualization needs LUN remapping. During LUN remapping (or mapping) virtual LUNs are mapped to actual physical LUNs. In SANs, storage virtualization is often desirable and makes it more efficient to manage large amounts of data.

As described above, Fibre Channel fabric switches are often used to couple various elements of a SAN. Conventional switches today do not provide a method or system by which they can efficiently map LUNs and hence facilitate storage virtualization.

Therefore, there is a need for a Fibre Channel switch element to efficiently handle LUN Mapping for facilitating storage virtualization.

SUMMARY OF THE PRESENT INVENTION

In one aspect of the present invention, a Fibre Channel switch element in a Fibre Channel network is provided. The Fibre Channel switch element includes a port that replaces a logical unit number ("LUN") field value in a FCP_CMND frame. The port includes a LUN Mapping cache for replacing the LUN field value in a FCP_CMND frame. The LUN Mapping cache may also generate a value that is added to or subtracted from the LUN field value in the FCP_CMND frame. A control bit is used to activate LUN Mapping cache for mapping LUN values.

In another aspect of the present invention, a SAN is provided with a Fibre Channel switch element having a port that replaces a LUN field value in a FCP_CMND frame, as described above.

In yet another aspect of the present invention, a method for processing FCP_CMND frames in a storage area network is provided. The method includes setting up a LUN mapping cache; comparing plural FCP_CMND frame fields; and substituting a LUN field value in the FCP_CMND frame with a LUN mapping cache entry.

The LUN field value in the FCP_CMND frame may be offset by a certain value generated by the LUN mapping cache.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
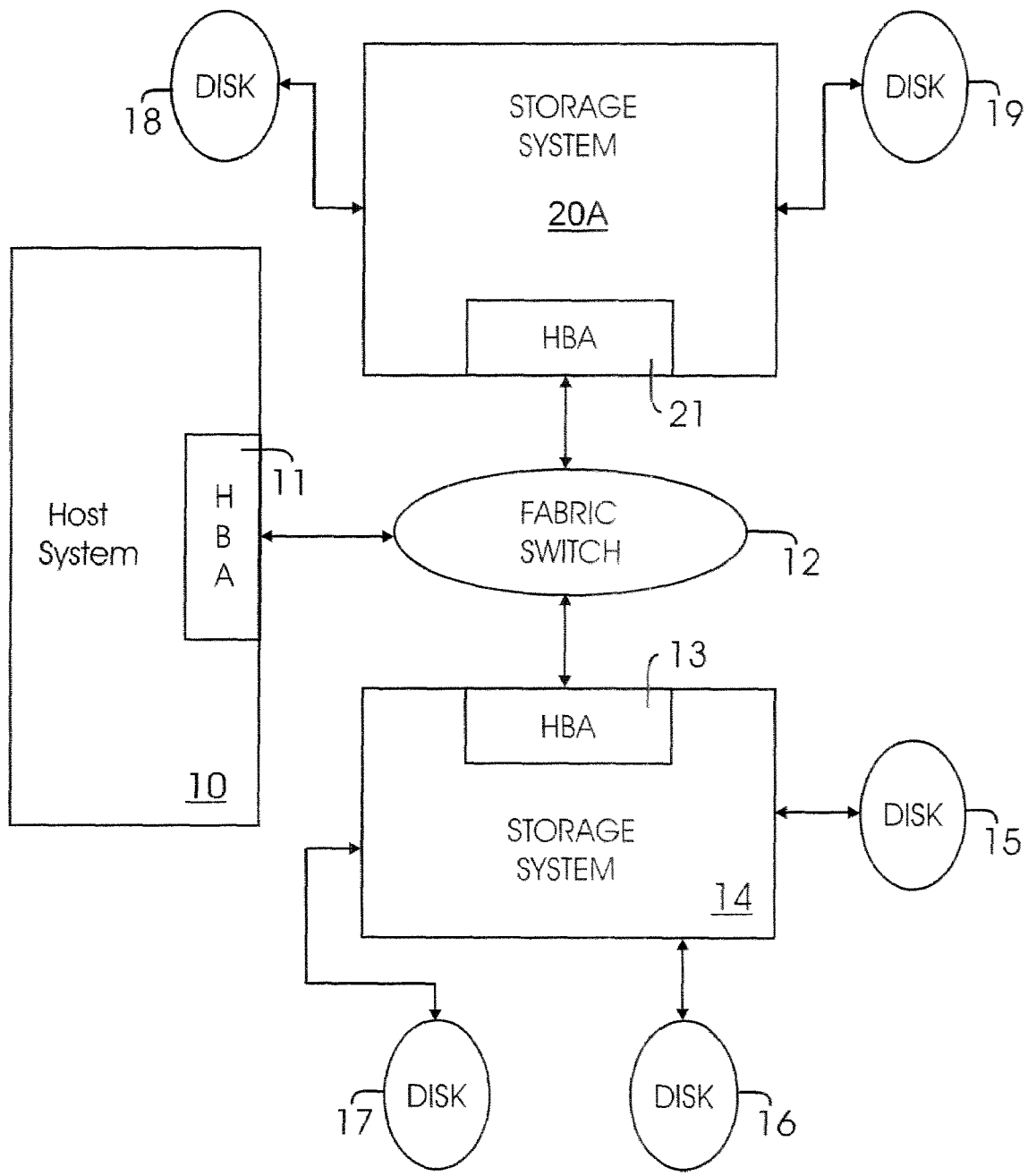
FIG. 1A shows an example of a Fibre Channel storage area network.

Definitions:

The following definitions are provided as they are typically (but not exclusively) used in the Fibre Channel environment, implementing the various adaptive aspects of the present invention.

"D_ID": A 24-bit Fibre Channel header field that contains the destination address for a frame.

"Exchange"—Operations for a SCSI data read or write. An exchange consists of three operational phases: command phase, data movement phase and response phase.

"E_Port": A fabric expansion port that attaches to another Interconnect port to create an Inter-Switch Link.

"Fabric": The structure or organization of a group of switches, target and host devices (NL_Port, N_ports etc.).

"FCP-2": A Fibre Channel protocol for mapping SCSI commands to Fibre Channel.

"FCP_CMND": A Fibre Channel frame defined by SCSI-FCP-2 standard that is incorporated herein by reference in its entirety.

"FCP_DATA": A Fibre Channel frame defined in SCSI_FCP-2 standard that carries SCSI data.

"F_Port": A port to which non-loop N_Ports are attached to a fabric and does not include FL_ports.

"Fibre Channel ANSI Standard": The standard (FC-FS and other standards)(incorporated herein by reference in its entirety) describes the physical interface, transmission and signaling protocol of a high performance serial link for support of other high level protocols associated with IPI, SCSI, IP, ATM and others.

"Initiator": A SCSI device that initiates an input/output ("I/O") operation, for example, a HBA.

"LUN": A unique logical unit number that identifies a sub-unit for a SCSI device. The LUN field is defined in the FCP_CMND payload.

"L_Port": A port that contains Arbitrated Loop functions associated with the Arbitrated Loop topology.

"OX_ID": An Originator (i.e., a device/port that originates an exchange) Exchange identification field in a Fibre Channel frame header.

"N-Port": A direct fabric attached port, for example, a disk drive or a HBA.

"NL_Port": A L_Port that can perform the function of a N_Port.

"PLOGI": Standard Fibre Channel N_Port to N_Port login. PLOGI determines the N_port to N_Port parameters and provides a specific set of operating parameters for communicating between N_ports. The port requesting PLOGI sends a PLOGI Extended Link Service Request addressed to the D_ID of an N_Port with which it needs to communicate. The addressed N_Port then returns an ACC (accept) reply. The request and reply contain operating parameters for communication between the N_Ports. The format for the request and reply are provided by the Fibre Channel standards.

"Port": A general reference to N. Sub.—Port or F.Sub.—Port.

"PRLI": Fibre Channel process login used by SCSI devices to establish a SCSI connection.

"R_CTL": A 8-bit Fibre Channel header field that identifies the type of frame.

"RX_ID": A responder (i.e., a device/port that responds) exchange identification field in a Fibre Channel frame header.

"SAM": SCSI Architecture Model

"SAN": Storage Area Network

"SCSI FCP": A standard protocol, incorporated herein by reference in its entirety for implementing SCSI on a Fibre Channel SAN.

"S_ID": A 24-bit field in a Fibre Channel frame header that contains the source address for a frame.

"Switch": A fabric element conforming to the Fibre Channel Switch standards.

"Target": A SCSI device that accepts I/O operations from Initiators, for example, storage devices such as disks and tape drives.

Switch Element

To facilitate an understanding of the preferred embodiment, the general architecture and operation of a Fibre Channel switch element will be described. The specific architecture and operation of the preferred embodiment will then be described with reference to the general architecture of the Fibre Channel system.

Figure 1B:
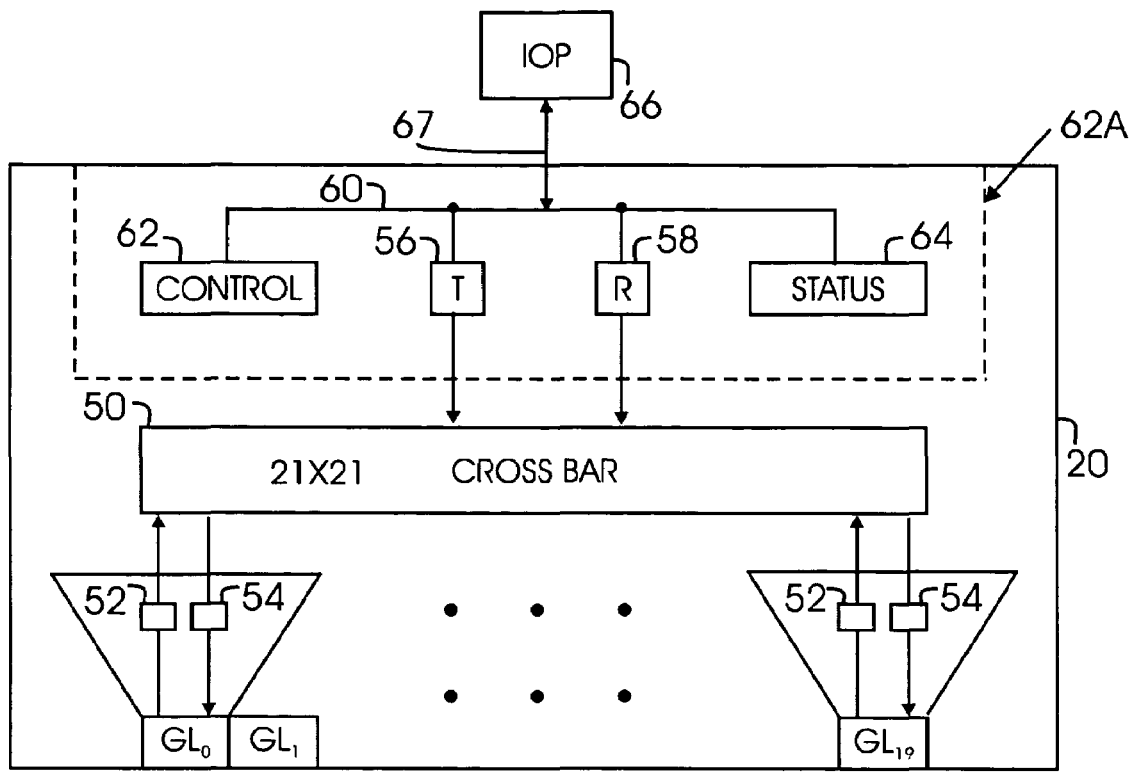
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
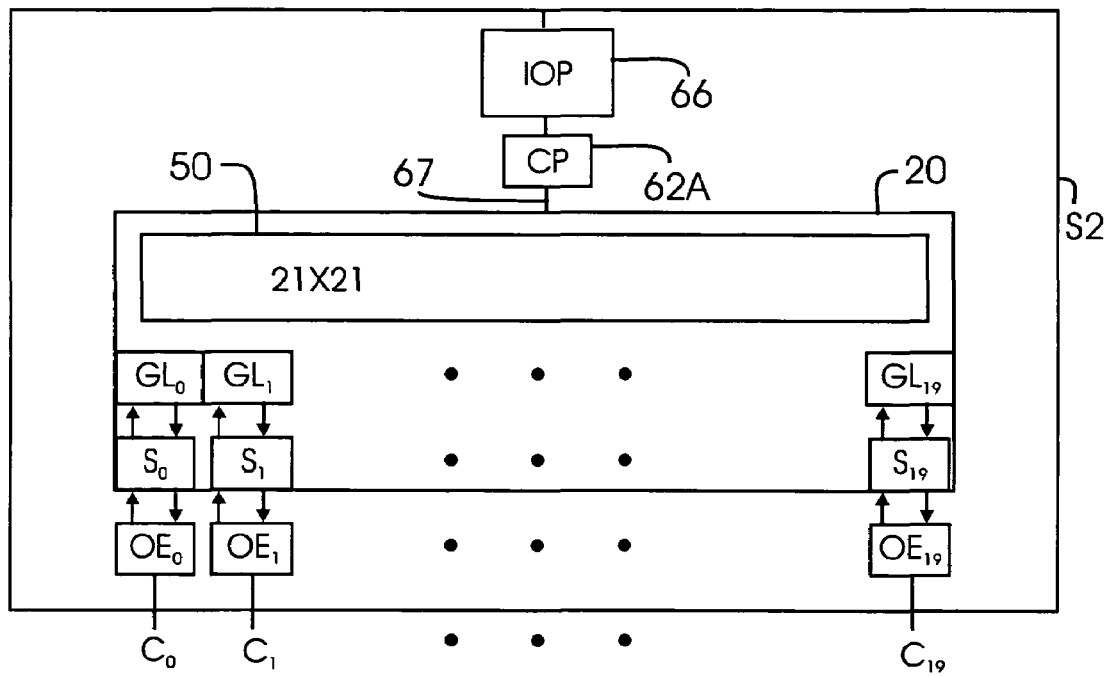
FIG. 1C shows a block diagram of a 20-channel switch chassis, according to one aspect of the present invention.

In the preferred embodiments of switch chassis described herein, the fabric controller is a firmware-programmed microprocessor, also referred to as the input/output processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
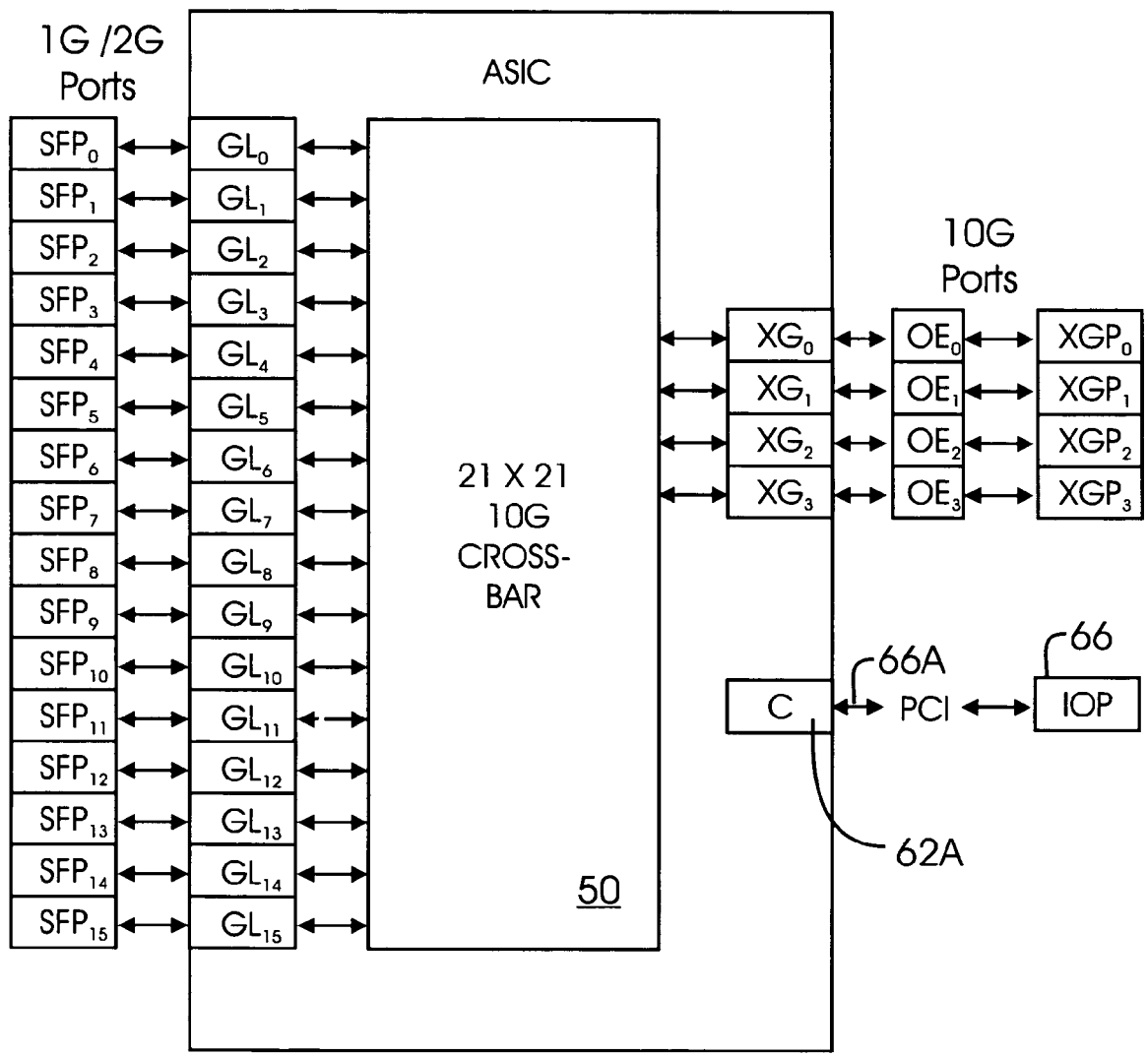
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figure 1E:
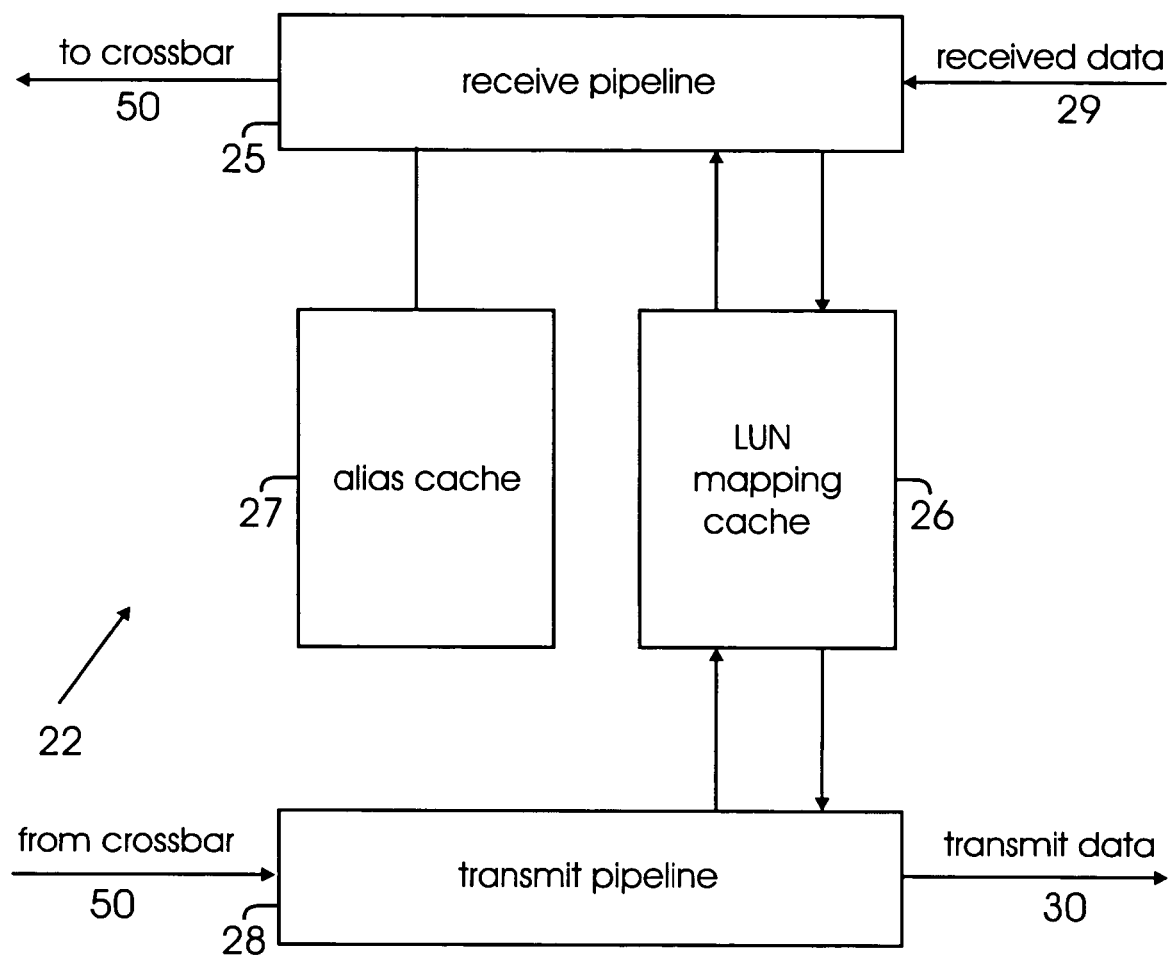
FIG. 1E shows a block diagram of a switch port used for mapping LUNs, according to one aspect of the present invention.

LUN Mapping Cache 26:

FIG. 1E shows an example of a port 22, according to one aspect of the present invention. Port 22 includes a receive pipeline 25 that receives Fibre Channel frames/data 29. Received data 29 is processed and then via crossbar 50 moves to a transmit pipeline 28. The transmit pipeline 28 transmits data 30 to the destination. Details of the pipelines and how frames are transmitted using alias cache 27 are provided in the patent application Ser. No. 10/894,546, filed on Jul. 20, 2004, the disclosure of which is incorporated herein by reference in its entirety.

Port 22 also includes a LUN Mapping cache 26 that substitutes (or adds/subtracts an offset value) the LUN field on frames being received or transmitted by port 22. The term "cache" as used herein is intended to include plural logic elements rather than just temporary storage.

LUN Mapping cache 26 matches S_ID, D_ID and the LUN field of an incoming FCP_CMND frame and the LUN field is substituted (or an offset value is added/subtracted) in the payload. When an offset value is used, then only the S_ID and D_ID fields are compared. LUN Mapping cache 26 includes multiple entries (as described below with respect to FIG. 2) that are compared simultaneously with plural fields in an incoming frame.

It is noteworthy that a new cyclic redundancy code ("CRC") value may also be calculated in the FCP_CMND based on a new LUN field value. The CRC value is computed and compared for maintaining frame integrity.

FCP_CMND frames are identified by a Fibre Channel header fields as follows:

"Type": The Type field has a value of 8 to identify a SCSI frame; and

R_CTL field has its upper 4 bits set to 0 and the lower 4 bits set to 6, which identifies an unsolicited command.

LUN Mapping cache 26 may be used to compare the D_ID and/or S_ID and/or LUN field of a command to a cache entry and if equal, an offset may be added to the LUN value in the command payload. The LUN value itself may be identified in a LUN Mapping cache 26 entry.

LUN Mapping cache 26 may also be used to compare the D_ID and/or S_ID and/or LUN field of a command to a cache entry and if equal, the LUN value in the command payload is substituted with a cache entry. The new LUN field value itself may be identified in a cache 26 entry.

LUN Mapping cache 26 may be included in a port attached to a SCSI initiator (for example, HBA 11). In this case bits 8-23 of the D_ID are compared.

LUN Mapping cache 26 may also be included at a port attached to a SCSI target (for example, HBA 21). In this case, bits 8-23 of the S_ID are compared. The LUN field itself may be a 2-byte field used by most devices or an 8-byte LUN structure as described by the SCSI SAM-2 specification, incorporated herein by reference in its entirety.

Figure 2:
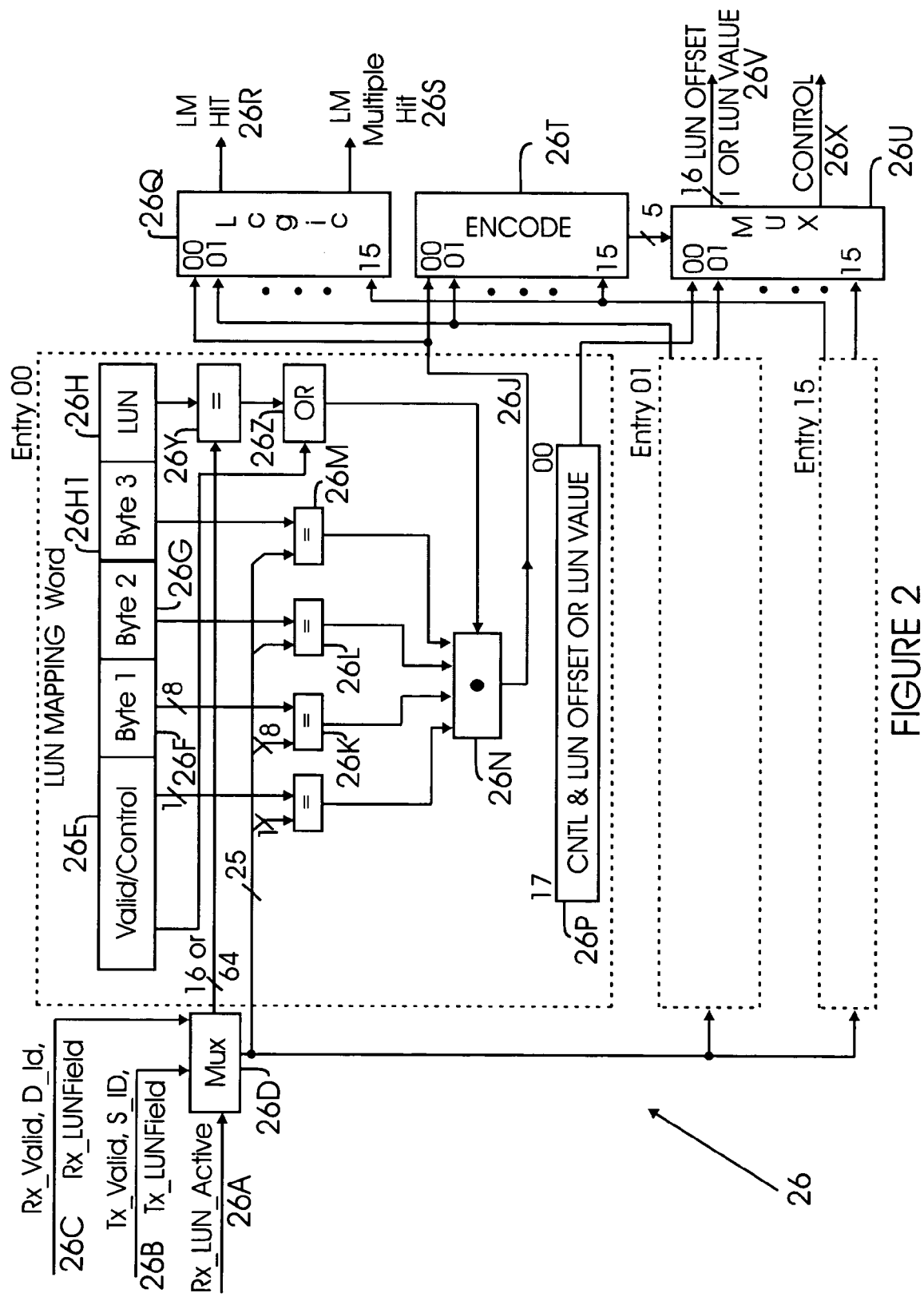
FIG. 2 shows a logic diagram of a LUN Mapping cache, according to one aspect of the present invention.

LUN Mapping Cache 26:

LUN Mapping cache 26 includes plural entries and compares the D_ID for frames received at a port or the S_ID for frames that are being transmitted from the port. FIG. 2 shows a detailed logic diagram from LUN Mapping cache 26 with entries 00 to entry 15 (i.e. 16 entries). Entry 00 includes entry 26P, a value for LUN substitution or for adding/subtracting a LUN offset value.

It is noteworthy that although various bit values are shown in FIG. 2, the adaptive aspects of the present invention are not limited to any particular bit value.

Cache 26 includes a multiplexer ("Mux") 26D that receives a 24-bit D_ID value 26C for frames that are received and a 24-bit S_ID value 26B for frames that are transmitted from a port (for example, 22). 26C also includes a Rx_valid signal that indicates a valid receive side frame and a receive side LUN value (Rx_LUN) Field. 26D includes a Tx_valid signal that indicates a valid transmit side frame and a transmit side LUN value (Tx_LUN) Field. The Rx_valid and Tx_valid signals provides both a timing qualifier to align the different data fields of 26C and 26B and to qualify the frame as a FCP_CMND for the receive and transmit frame respectively.

Command/signal 26A (shown as Rx_LUN_Active) is used to enable LUN Mapping in receive or transmit side, according to one aspect of the present invention.

Incoming frames D_ID or S_ID values are compared by logic 26K, 26L, 26M and 26Y with entries 26F, 26G, 26H1 and 26H, respectively. A valid bit in 26E is set if a cache entry is enabled for comparison.

Entry 26H includes a LUN field that is compared with the LUN field in the frame (i.e. Rx_LUN Field or Tx_LUN Field). LUN field 26H comparison is performed by logic 26Y that also receives an input (Rx_LUN Field and/or Tx_LUN Field) from Mux 26D. Output from logic 26Y is sent to logic 26Z (an OR gate).

Logic 26N generates a command/signal (output 26J) based on the comparison. Output 26J is sent to logic 26Q that generates a hit LUN Mapping signal 26R or a multiple (LUN Mapping) hit signal 26S. If a multiple hit signal 26S is generated, then the lowest entry number may be used and an error status is set and sent to IOP 66.

Output 26J is also sent to an encoder module 26T, whose output is sent to MUX 26U. If hit signal 26R is generated then the LUN from the cache entry (26P) is substituted (or LUN offset value is added/subtracted) in the frame header LUN field. This is shown as 26V in FIG. 2. A control bit in logic 26P or 26E may be set to select between LUN value substitution or an offset operation.

Figure 3:
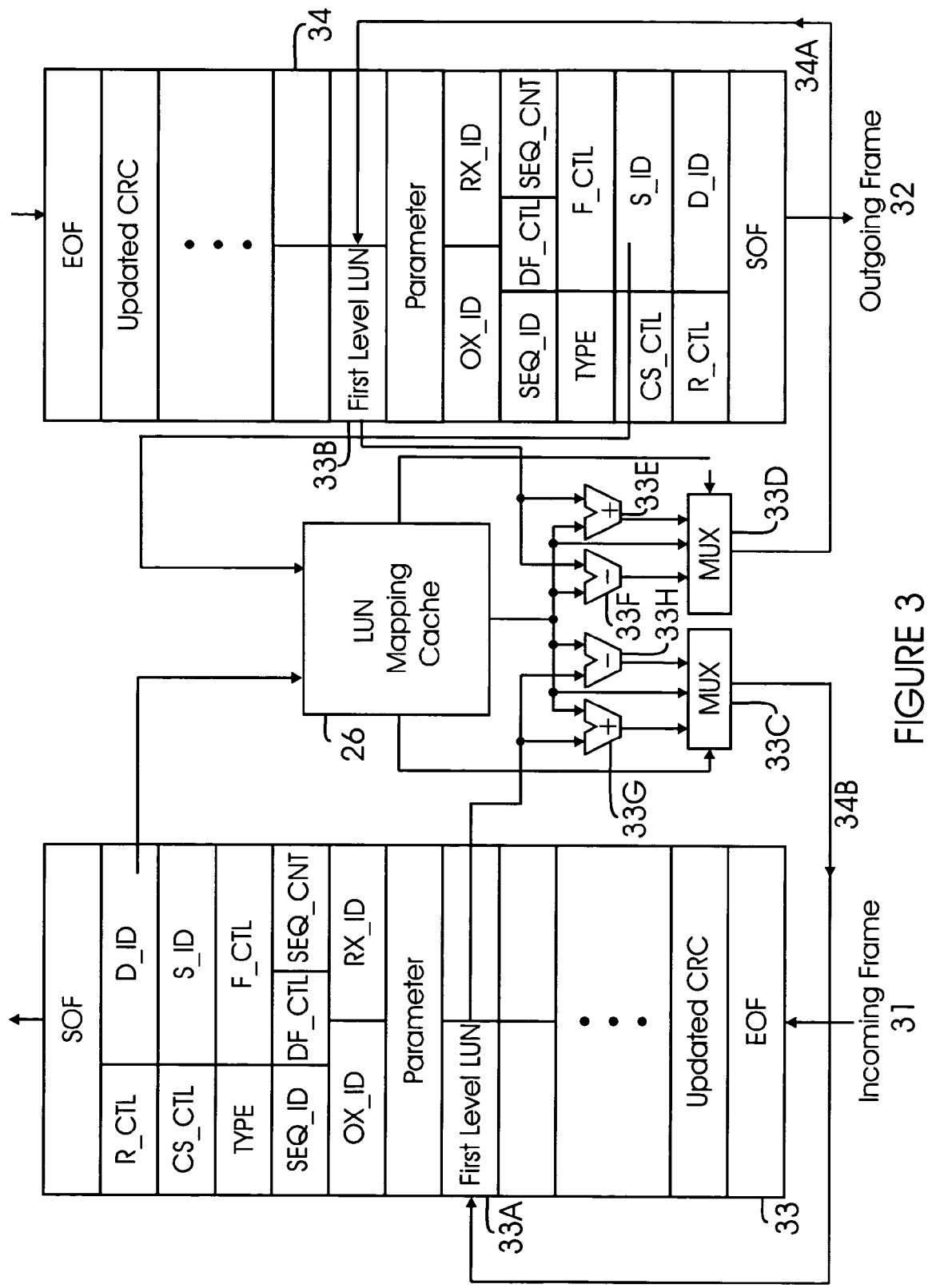
FIG. 3 shows a block diagram for LUN substitution, according to one aspect of the present invention.

A control signal 26X is also generated that allows LUN field substitution. Control signal 26X (or bits) is used to control the operation of Mux 33C and Mux 33d (FIG. 3).

If LUN Mapping cache 26 is located on the initiator side, then the following fields are used:

D_ID: 24 bits are matched to the D_ID of incoming FCP_CMND frames;

S_ID: 8-bits are optionally matched to the lower 8-bits of S_ID, in case multiple devices are attached to the port due to an Arbitrated Loop configuration or if the N_Port Virtual identifier is used;

LUN match: 16 bits are used if only the first level LUN is used or 64-bits are used if the full LUN value is used. The LUN match may not be optionally used when LUN substitution is configured using an offset addition or subtraction. The LUN match may be enabled or disabled by control bits in 26E;

Substitute LUN: 16-bits or 64-bits are used for substitution depending on the level of the LUN. The substitute LUN value may be generated by addition/subtraction of the offset value from 26P and the value in the frame or directly from 26P itself; and 26E has a valid flag (and control bits) if a cache entry has been configured for use.

A mode flag (in the control register at control port 62 and/or 62A) may be used so that after the addresses and LUN field are compared, either a LUN substitution or LUN offset value is added (or subtracted). This control may also be used in 26E or 26P as described above.

FIG. 3 shows a block diagram of how LUN substitution takes place. A frame 31 enters a port (for example, 22). The various frame fields are shown in Table 33. An outgoing frame from a port is shown as 32 and the various frame fields are shown in Table 34.

The control bits (or mode flags) are used to either replace the LUN value or add/subtract an offset value. Logic 33G and 33E is used to add a LUN offset value (from 26P), while logic 33F and 33H is used for subtraction.

The value that is placed in an incoming frame is shown as 34B, and in an outgoing frame it is shown as 34A. Mux 33C and 33D are used to generate values 34B and 34A, respectively.

Figure 4:
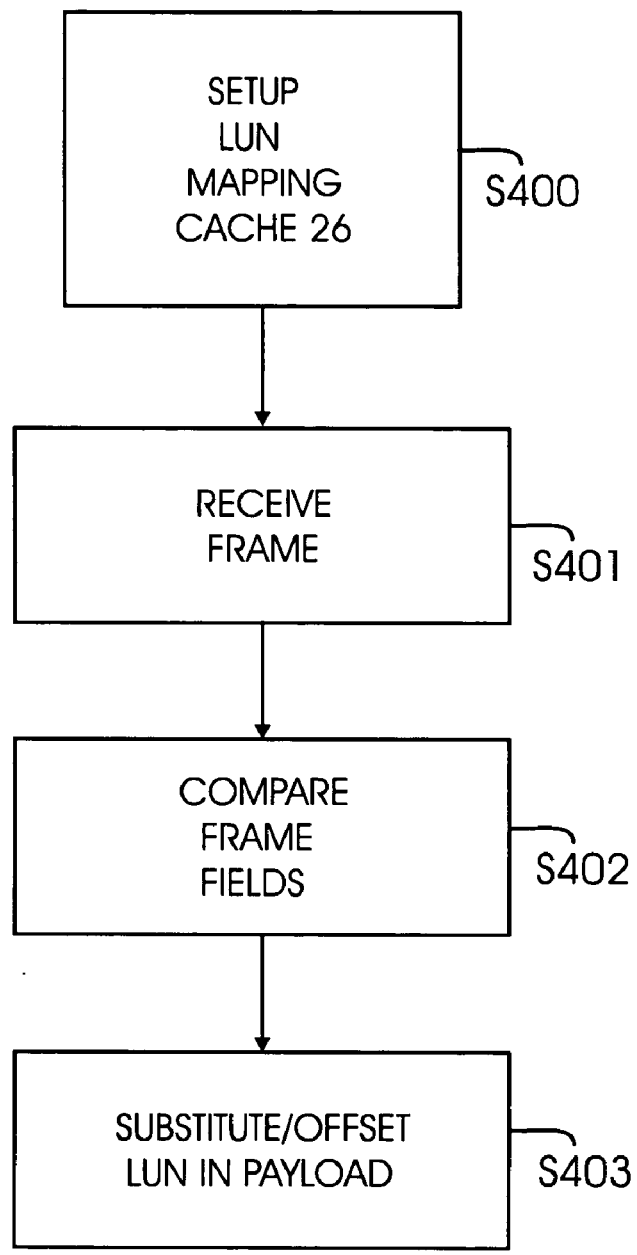
FIG. 4 shows a process flow diagram for LUN substitution, according to one aspect of the present invention.

FIG. 4 shows a flow diagram for using LUN Mapping cache 26, according to one aspect of the present invention. In step S400, LUN Mapping cache 26 is set up by firmware of switch element 20. A control bit in control port 62 and 62A identifies whether an entire LUN field in a FCP_CMND is to be substituted or an offset is to be added/subtracted.

In step S401, a frame is received, for example frame 31.

In step S402, incoming frame fields are compared to LUN Mapping cache 26 entries, described above with respect to FIG. 2.

In step S403, either the LUN field is substituted or an offset is added/subtracted from the LUN field value in the incoming frame, as described above.

The process shown in FIG. 4 is also applicable for an outgoing frame (for example, frame 32).

In one aspect of the present invention, storage virtualization is improved because a Fibre Channel switch element can efficiently map LUN values by associating virtual LUN values to physical LUN values.

Although the present invention has been described with reference to specific embodiments, these embodiments are illustrative only and not limiting. Many other applications and embodiments of the present invention will be apparent in light of this disclosure and the following claims.

What is claimed is:

1. A Fibre Channel switch element in a Fibre Channel network, comprising:

a port having (i) a receive segment for receiving a fibre channel frame; (ii) a transmit segment for transmitting a fibre channel frame; (iii) a control segment that stores an indicator value to identify whether an entire logical unit number (LUN) field in a FCP_CMND frame is to be replaced; or an offset value is to be added or subtracted from the FCP_CMD frame; and (iv) a hardware based LUN mapping cache that replaces the entire LUN field value in the FCP_CMND frame with the new LUN field value; or adds the offset value to the FCP_CMND frame or subtracts the offset value from the FCP_CMND frame based on the indicator value, wherein for each replaced LUN field value in the FCP CMND frame; a cyclic redundancy code (CRC) field value is replaced by a newly computed CRC value using the new LUN field value, and wherein the LUN Mapping cache generates the offset value that is either added to or subtracted from the LUN field value in the FCP CMND frame based on the indicator value.

2. The Fibre Channel switch element of claim 1, wherein the LUN Mapping cale generates the new LUN field value that is directly substituted in the FCP_CMND frame.

3. The Fibre Channel switch element of claim 1, wherein a destination identifier (D_ID), a source identifier (S_ID), or a LUN field of the FCP_CMND frame is compared to a LUN mapping cache entry to identify a frame for a LUN field value substitution 4. The Fibre Channel switch element of claim 1, wherein a destination identifier D_ID, a source identifier S_ID, or a LUN field of the FCP_CMND frame is compared to a LUN mapping cache entry t obtain a LUN field substitution value.

5. The Fibre Channel switch Element of claim 1, wherein the LUN mapping cache simultaneously compares plural frame fields to generate a hit signal.

6. The Fibre Channel switch element of claim 1, wherein the indicator value from the control segment activates the LUN mapping cache for mapping LUN values.

7. The Fibre Channel switch element of claim 1, wherein an error status is set, if a multiple hit signal is generated after the LUN mapping cache compares plural frame fields 8. The Fibre Channel switch element of claim 1, wherein the LUN mapping cache performs LUN mapping for both incoming and outgoing frames.

9. A storage area network ("SAN"), comprising:
a Fibre Channel switch element coupled to at least two network devices communicating with each other; wherein the Fibre Channel switch element includes: a port with (i) a receive segment for receiving a fibre channel frame; (ii) a transmit segment for transmitting a fibre channel frame; (iii) a control segment that stores an indicator value to identify whether an entire logical unit number (LUN) field in a FCP_CMND frame is to be replaced; or an offset value is to be added or subtracted from the FCP_CMD frame; and (iv) a hardware based LUN mapping cache that replaces the entire LUN field value in the FCP_CMND frame with the new LUN field value; or adds the offset value to the FCP_CMND frame or subtracts the offset value from the FCP_CMND frame based on the indicator value, wherein for each replaced LUN field value in the FCP CMND frame; a cyclic redundancy code (CRC) field value is replaced by a newly computed CRC value using the new LUN field value, and wherein the LUN Mapping cache generates the offset value that is either added to or subtracted from the LUN field value in the FCP CMND frame based on the indicator value.

10. The SAN of claim 9, wherein the LUN mapping cache simultaneously compares plural frame fields to generate a hit signal.

11. The SAN of claim 9, wherein the indicator value from the control segment activates the LUN mapping cache for mapping LUN values.

12. The SAN of claim 9, wherein an error status is set, if a multiple hit signal is generated after the LUN mapping cache compares plural frame fields.

13. The SAN of claim 9, wherein the LUN mapping cache performs LUN mapping for both incoming and outgoing frames.

14. A method for processing FCP_CMND frames in a storage area network having a fibre channel switch element, comprising:
setting up a hardware based LUN mapping cache at a port of the fibre channel switch element, wherein the port includes a receive segment for receiving a fibre channel frame; a transmit segment for transmitting a fibre channel frame; and a control segment that stores an indicator value to identify whether an entire logical unit number (LUN) field in a FCP_CMND frame is to be replaced; or an offset value is to be added or subtracted from the FCP_CMND frame; and wherein the indicator value from the control segment activates the LUN mapping cache for mapping LUN values;
comparing plural FCP_CMND frame fields with the LUN mapping cache entries; and substituting a LUN field value in the FCP_CMND frame with a new LUN field value based on a LUN mapping cache entry; wherein the LUN mapping cache replaces the entire LUN field value in the FCP_CMND frame with the new LUN field value; adds the offset value to the FCP_CMND frame or subtracts the offset value from the FCP_CMND frame based on the indicator value, wherein for each replaced LUN field value in the FCP CMND frame; a cyclic redundancy code (CRC) field value is replaced by a newly computed CRC value using the new LUN field value, and wherein the LUN Mapping cache generates the offset value that is either added to or subtracted from the LUN field value in the FCP CMND frame based on the indicator value.

15. The method of claim 14, wherein a source identifier (S_ID), a destination identifier (D_ID), or a LUN field value of the FCP_CMND frame is compared to a LUN mapping cache entry to identify a frame for a LUN field value substitution.

16. The method of claim 14, wherein the LUN mapping cache performs LUN mapping for both incoming and outgoing frames.

17. The method of claim 14, wherein an error status is set, a multiple hit signal is generated after the LUN mapping cache compares a plurality of frame fields.

* * * * *

UNITED STATES PATENT AND TRADEMARK OFFICE
CERTIFICATE OF CORRECTION

PATENT NO. : 7,593,997 B2
APPLICATION NO. : 10/956502
DATED : September 22, 2009
INVENTOR(S) : Frank R. Dropps et al.

It is certified that error appears in the above-identified patent and that said Letters Patent is hereby corrected as shown below:

In column 3, line 56, delete "standards)(incorporated" and insert -- standards) (incorporated --, therefor.

In column 5, line 58, delete "XGPO-XGP3." and insert -- XGP0-XGP3. --, therefor.

In column 8, line 39, in claim 1, delete "FCP_CMD" and insert -- FCP_CMND --, therefor.

In column 8, line 46, in claim 1, delete "FCP CMND" and insert -- FCP_CMND --, therefor.

In column 8, line 51, in claim 1, delete "FCP CMND" and insert -- FCP_CMND --, therefor.

In column 8, line 54, in claim 2, delete "cale" and insert -- cache --, therefor.

In column 8, line 60, in claim 3, after "substitution" insert -- . --.

In column 8, line 64, in claim 4, delete "t" and insert -- to --, therefor.

In column 9, line 6, in claim 7, after "fields" insert -- . --.

In column 9, line 20, in claim 9, delete "FCP_CMD" and insert -- FCP_CMND --, therefor.

In column 9, line 26, in claim 9, delete "FCP CMND" and insert -- FCP_CMND --, therefor.

In column 9, line 31, in claim 9, delete "FCP CMND" and insert -- FCP_CMND --, therefor.

In column 10, line 24, in claim 14, delete "FCP CMND" and insert -- FCP_CMND --, therefor.

In column 10, line 29, in claim 14, delete "FCP CMND" and insert -- FCP_CMND --, therefor.

In column 10, line 40, in claim 17, delete "set," and insert -- set, if --, therefor.

Signed and Sealed this

Nineteenth Day of October, 2010

David J. Kappos
*Director of the United States Patent and Trademark Office*